March 22, 1966     L. MALNAR ETAL     3,242,435
WIDE-BAND DISCRIMINATORS UTILIZING INTERNAL FEED BACK
Filed July 30, 1963

3,242,435
WIDE-BAND DISCRIMINATORS UTILIZING INTERNAL FEEDBACK
Léon Malnar and Jean Dardenne, Paris, France, assignors to CSF—Compagnie Generale de Telegraphie Sans Fil, a corporation of France
Filed July 30, 1963, Ser. No. 298,670
Claims priority, application France, Aug. 7, 1962, 906,286, Patent 1,337,855
3 Claims. (Cl. 329—136)

It may be desirable under certain conditions to extract the information from a frequency-modulated signal, the mean frequency of which, though carrying no information, is unknown or has no stability and varies within wide limits. For example, in devices known as optical pumping magnetometers, the average frequency is proportional to the mean value of the terrestrial magnetic field which is not known with precision and is liable to undergo variations of several octaves, for example 70 kc. to 250 kc.

The present invention has for its object a phase-discriminator capable of solving this problem.

A phase-discriminator according to the invention includes a synchronous detector to which the wave carrying the information, is applied and one of the input channels of which includes a phase-shifter arranged for delaying the signal by $p \times \pi/2$.

Other characteristics of the system according to the invention will become apparent from the ensuing description and appended drawings wherein.

Figure 1:
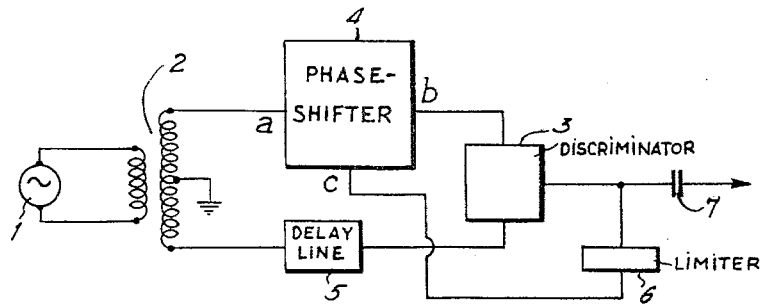
FIG. 1 is a block diagram of the system according to the invention.

In the embodiment shown in FIG. 1, the signal from a source 1 is applied to the primary winding of a transformer 2, the secondary winding of which has its mid-point grounded.

One of the terminals of the secondary winding is connected to an input $a$ of an adjustable phase-shifter 4, whose output $b$ is connected to one of the inputs of a synchronous detector 3. The other terminal of the secondary winding of transformer 2 is connected to the input of a delay-line 5 providing a fixed delay $\tau$. The output of delay-line 5 is connected to the second input of detector 3.

A limiter 6 is connected between the control input $c$ of the phase-shifter 4 and detector 3, for adjusting the variable phase-shafter in a manner to be indicated later.

The system operates as follows:

Let $s_1$ be the input carrying the information. One may write:

$$s_1 = A \sin [\omega_1 t + \varphi(t)] \qquad (1)$$

where $\omega_1 = 2\pi f_1$ is the average angular frequency and $\varphi(t)$ the instantaneous phase containing the information. It will be assumed that $\varphi(t)$ has a maximum value which is small as compared to $\pi$.

The case where phase-shifter 4 does not introduce any phase-shift will be considered first. Detector 3 receives signal $s_1$ and a signal $s_2$ which may be written:

$$s_2 = -A \sin [\omega_{i1}(t-\tau) + \varphi(t-\tau)] \qquad (2)$$

$\tau$ being the delay caused by the delay-line 5.

By a synchronous detector is designated here a known device which provides at its output a signal proportional to the sine of the phase difference between the two input signals. The latter may be accordingly written:

$$s_3 = A \sin [\omega_1 \tau + \varphi(t) - \varphi(t-\tau)]$$

Assuming that the limited expansion of $\varphi(t)$ is possible $$\varphi(t) - \varphi(t-\tau) = \tau \varphi'(t) = \tau \frac{d\varphi}{dt}$$

$s_3$ may then be written:

$$s_3 = A \sin [\omega_1 \tau + \tau.\varphi'(t)] \qquad (3)$$
$$= A \sin [\omega_1 + \varphi'(t)]\tau$$

By setting $\omega_1 + \varphi'(t) = \omega$ one may write:

$$\frac{d}{dt}[\omega_i t + \varphi(t)] = \omega$$

The detected signal may be written:

$$s_3 = A \sin \omega \tau$$

Now it is known that a sine curve can be considered as being built up by a succession of straight line portions joined to each other by non-linear segments, the linear portions corresponding to $\omega \tau$ values close to $0 + K\pi$, K being an integer.

Accordingly the discriminator characteristic curve is $$s_3 = A \sin \omega \tau$$

A being a constant and $\omega$ the instantaneous angular frequency of the signal, it is a straight line when $\omega \tau$ is close to $K\pi$.

Figure 2:
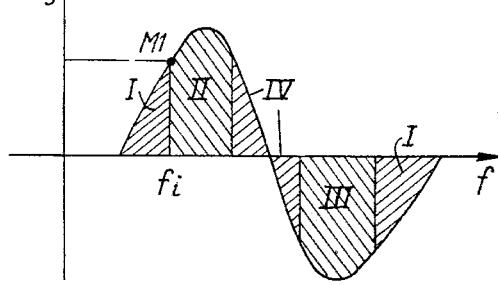
FIGS. 2 and 3 are explanatory graphs.

FIG. 2 shows that modulation characteristic curve, with the frequency values $f$ plotted along the abcissae and the signal amplitude values $s_3 = A \sin \omega \tau$ along the ordinates.

The working point $M_1$ corresponds to $\varphi(t)=0$. It corresponds to the value of the function $$s_3 = s_3(f_1) = A \sin \omega_1 \tau$$

($\omega_1$ being the mean angular frequency value).

According to the values of $\omega_1$ the working point is in one of the regions I, II, III or IV on FIG. 2.

According to the invention, phase-shifter 4 is used for shifting step-by-step the characteristic curve along the frequency axis, so that point $M_1$ remains located in the region I of the characteristic. To this end, signal $s_3$ is phase-shifted by value $p \times \pi/2$ to become:

$$s_{30} = A \sin (\omega \tau + p/\pi 2) \qquad (4)$$

$p$ being a suitably selected integer.

A high-pass filter 7 separates the variable part of the signal, i.e. that containing the information, from that part of the signal which undergoes variations only because of the frequency variations.

This latter signal part may be given by:

$$s_{30} = A \sin (\omega_1 \tau + p\pi/2)$$

Figure 3:
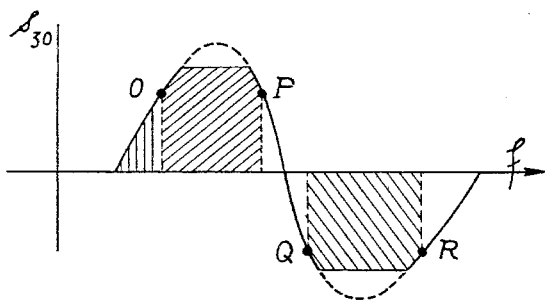

The information is obtained at the output of filter 7. A limiter 6 is inserted between the output of the synchronous detector and the control input of phase-shifter 4. The output current of limiter 6 is as shown in FIG. 3.

Figure 4:
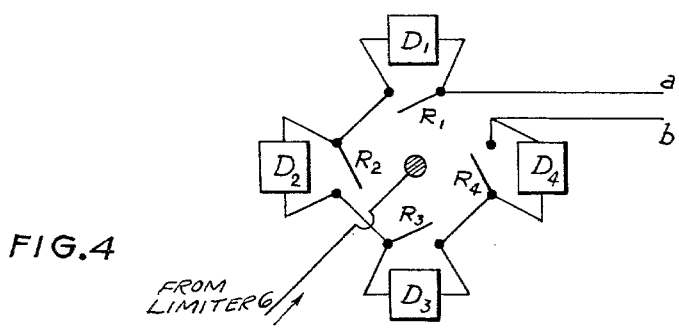
FIG. 4 is an example of a phase-shifter used in the system shown in FIG. 2.

An embodiment of phase-shifter 4 is illustrated on FIG. 4.

In includes four phase-shifters $D_1$ to $D_4$ giving a $\pi/2$ phase-shift within the whole range of variations of the frequency $f_1$, say, for example, between 70 and 250 kc.; phase-shifters $D_1$ to $D_4$ are connected in series, the terminals $a$ and $b$ of the circuit being respectively connected as indicated above. Phase-shifters $D_1$ to $D_4$ can be respectively short-circuited by means of switches $R_1$ to $R_4$, which are controlled by a relay in the following manner:

As long as current $s_{30}$ has not reached the positive clipping level, switches $R_1$ to $R_4$ are switched in. When the clipping level is reached switch $R_1$ is switched out, phase-shifter 4 thus providing a phase-shift $\pi/2$; current $s_{30}$ decreases but a further increase of the frequency $f_1$ provides again the positive clipping action of limiter 6 and switch $R_2$ is switched out, phase-shifter 4 thus giving an additional phase-shift $\pi/2$. Switches $R_3$ and $R_4$ are operated in the same way each time the positive clipping level is reached. At or about the moment the negative switching level is reached by a decrease in frequency $f_1$, the switches $R_1$ to $R_4$ are closed one by one under the control of limiter 6.

Thus the value of $p$ is at all times automatically selected to have values 1, 2, 3 or 4.

Delay $\tau$ may be easily derived, taking in account the characteristics of the signal to discriminate.

The information signal may be written:

$$s_3 = A\varphi'(t)\tau$$

It is proportional to delay $\tau$. However, it can be shown that a good sensitivity can be obtained with a relatively small delay.

As a matter of fact the figure of merit S of the synchronous detector is given by:

$$S = \frac{\Delta f_m}{B} = \frac{\varphi'm(t)}{2\pi B}$$

where B is the pass-band.

It can be shown that a satisfactory sensitivity is obtained for $\tau = 1/2B$.

Hence, $$\Delta f_m = SB = \frac{S}{2\tau}$$

For a delay-line giving a delay $\gamma = 30 \times 10^{-6}$ sec, which can be readily achieved, the sensivity is then:

$$\Delta f_m = 2 \times 10^{+6} \times \frac{1}{60} \times 10^{-6} = 0.03 \text{ cs.}$$

For example, in an optical resonance magnetometer, the variation $\Delta f_m$ is related to the magnetic field variation $\Delta H$ $$\Delta f_m = 3 \times 10^5 \Delta H$$

where H is expressed in oersteds. Then, the minimum field variation that can be observed is:

$$\Delta H_m = \frac{\Delta f_m}{3 \times 10^5} = 0.01 \times 10^{-5}$$

It will be noted that the choice of the delay-line is independent of the information rate F. It is the same with regard to sensitivity $\Delta f_m$.

Delay $\tau$ is independent of the variation range of the average frequency. However, that delay has to remain constant within that range.

If the operation of the system is to be limited to frequency variations between a minimum frequency value $f_m$ and a maximum frequency $f_M$, such that no switching is necessary the variation curve being linear, the following relation would have to be satisfied:

$$f_M - f_m < B = \frac{1}{2\tau}$$

Then:

$$S = \frac{\Delta f_m}{B}$$

It could be shown that the sensitivity is ten times lower than in the system according to the invention. Hence, for $f_M = 250$ kc. and $f_m = 70$ kc.:

$$\Delta f_m > 2 \times 10^{-6} \times 175 \times 10^3$$

$$\Delta f_m > 0.3 \text{ cs.}$$

A discriminator according to the invention affords many advantages:

(a) The average frequency variation range can vary within wide limits and reach several octaves;

(b) The sensitivity is very good, the minimum detectable frequency variation may be as low as $2 \times 10^{-7}$ with switching;

(c) The linearity is always satisfactory, whatever the average frequency value;

(d) Such a discriminator is particularly suitable each time the frequency depends on the characteristics of the physical quantity to be measured; it is suitable for study of phenomena presenting very sharp resonances, it being possible to have a quality factor as high as $10^7$;

(e) The system sensitivity is independent of the information rate; this is a very valuable feature when the information rate is relatively low due to a slow detection of the phenomenon to be measured;

(f) The system is usable within a wide measuring range; in particular when used for magnetic field measurements by optical resonance, the system keeps a good sensitivity within a measuring range from $H_0$ to $4H_0$; in addition, the detection of magnetic field variations about its mean value can be achieved at a very slow rate, which is very important when a long time period is necessary to travel across the area within which that variation occurs because of the limited speed of the measurement means.

Of course the invention is not limited to the embodiments described which were given solely by way of example.

What is claimed is:

1. A phase discriminator for extracting the information from a frequency modulated signal, the carrier frequency of which is variable, comprising in combination: a synchronous detector having first and second input channels and an output; means for applying to said channels the wave containing the information; a fixed delay line in said first channel; in said second channel a controllable phase shifter for phase shifting said wave by an angle $p\pi/2$, $p$ being a controllable integer; and control means connected to said output for controlling the value of $p$.

2. A phase discriminator for extracting the information from a frequency modulated signal the carrier frequency of which is variable comprising in combination: a synchronous detector having a first and a second input channel and an output; means for applying to said channels the wave containing the information; a fixed delay line in said first channel; in said second channel a controllable phase shifter for phase shifting said wave by an angle $p\pi/2$, $p$ being a controllable integer, said controllable phase shifter comprising a plurality of $\pi/2$ phase shifters connected in series; means selectively short-circuiting said phase shifters; said means having a control input; a rejector high pass filter in said output for separating the frequency modulated wave from the information, having an input and an output for delivering said information; a threshold device connected to said input of said filter, and having an output for actuating said short-circuiting means.

3. A phase discriminator for extracting the information from a frequency modulated signal, the carrier frequency of which is variable, comprising in combination: a synchronous detector having first and second input channels and an output; means for applying to said channels the wave containing the information; a fixed delay line in said first channel; in said second channel a controllable phase shifter for phase-shifting said wave by an angle $p\pi/2$, $p$ being a controllable integer; a rejector high pass filter in said output for separating the frequency modulated wave from the information, having an input and an output for delivering said information; a threshold device connected to said input of said filter, and having an output for controlling said phase shifter.

References Cited by the Examiner

UNITED STATES PATENTS

| | | | |
|---|---|---|---|
| 2,836,712 | 5/1958 | Crosby | 329—50 X |
| 2,976,363 | 3/1961 | Barton | 329—50 X |

HERMAN KARL SAALBACH, *Primary Examiner.*

ROY LAKE, *Examiner.*

P. L. GENSLER, *Assistant Examiner.*